(No Model.) 6 Sheets—Sheet 1.

C. H. GRAY.
MACHINE FOR MOLDING SCREW BOTTLE STOPPERS OR OTHER ARTICLES FROM PLASTIC MATERIAL.

No. 590,145. Patented Sept. 14, 1897.

(No Model.)  6 Sheets—Sheet 4.
C. H. GRAY.
MACHINE FOR MOLDING SCREW BOTTLE STOPPERS OR OTHER ARTICLES FROM PLASTIC MATERIAL.
No. 590,145.  Patented Sept. 14, 1897.
Fig. 4.
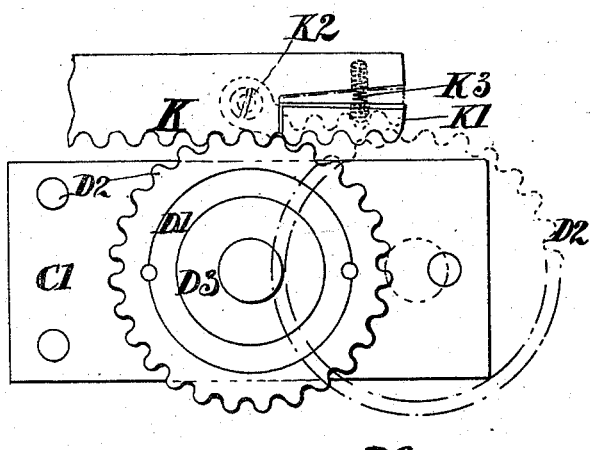
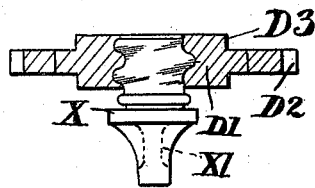
Fig. 5.
Witnesses  Inventor
Christian H. Gray
by      Attorney (No Model.) 6 Sheets—Sheet 5.

C. H. GRAY.
MACHINE FOR MOLDING SCREW BOTTLE STOPPERS OR OTHER ARTICLES FROM PLASTIC MATERIAL.

No. 590,145. Patented Sept. 14, 1897.

(No Model.) 6 Sheets—Sheet 6.
C. H. GRAY.
MACHINE FOR MOLDING SCREW BOTTLE STOPPERS OR OTHER ARTICLES FROM PLASTIC MATERIAL.

No. 590,145. Patented Sept. 14, 1897.

UNITED STATES PATENT OFFICE.

CHRISTIAN HAMILTON GRAY, OF SILVERTOWN, ENGLAND.

MACHINE FOR MOLDING SCREW BOTTLE-STOPPERS OR OTHER ARTICLES FROM PLASTIC MATERIAL.

SPECIFICATION forming part of Letters Patent No. 590,145, dated September 14, 1897.

Application filed November 28, 1896. Serial No. 613,825. (No model.) Patented in England May 2, 1896, No. 9,353, and in France May 8, 1896, No. 256,208.

*To all whom it may concern:*

Be it known that I, CHRISTIAN HAMILTON GRAY, a subject of the Queen of England, residing at Silvertown, Essex, England, have invented certain new and useful Improvements in Machines for Molding Screw Bottle-Stoppers and other Articles from Plastic Material, (for which I have obtained Letters Patent in Great Britain, No. 9,353, dated May 2, 1896, and in France, No. 256,208, dated May 8, 1896,) of which the following is a specification.

The object of this invention is the construction of machines for molding screw bottle-stoppers and other articles with or without screw-threads from a plastic material—such, for instance, as rubber composition, celluloid, vulcanite, or the like. Hitherto such articles have been made in a series of operations partly manual and partly mechanical, and as a whole tedious and expensive, whereas by the use of a machine such as is hereinafter described the speed of production is increased and the cost reduced.

Figure 1:
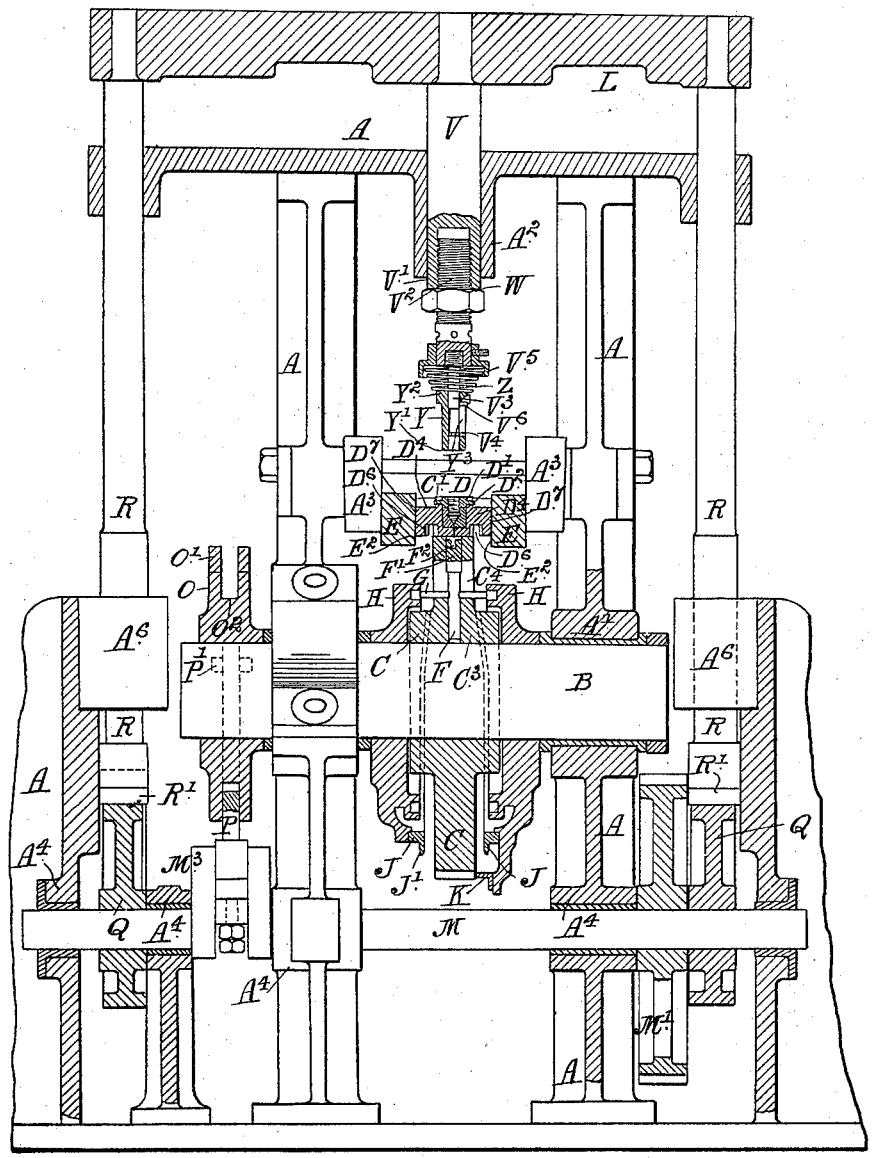
Figure 2:
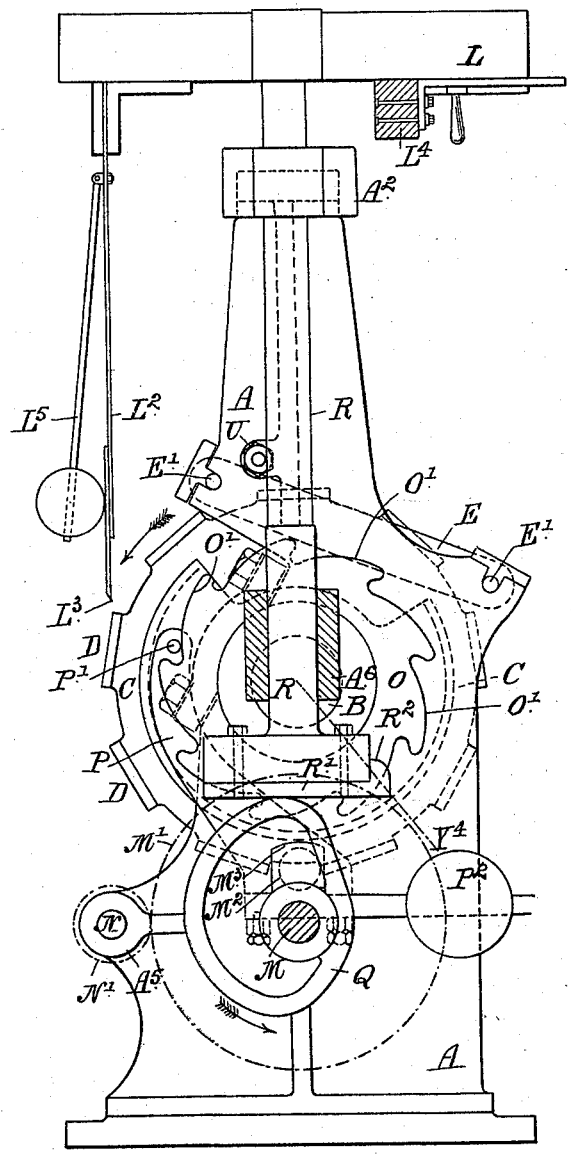
Figure 3:
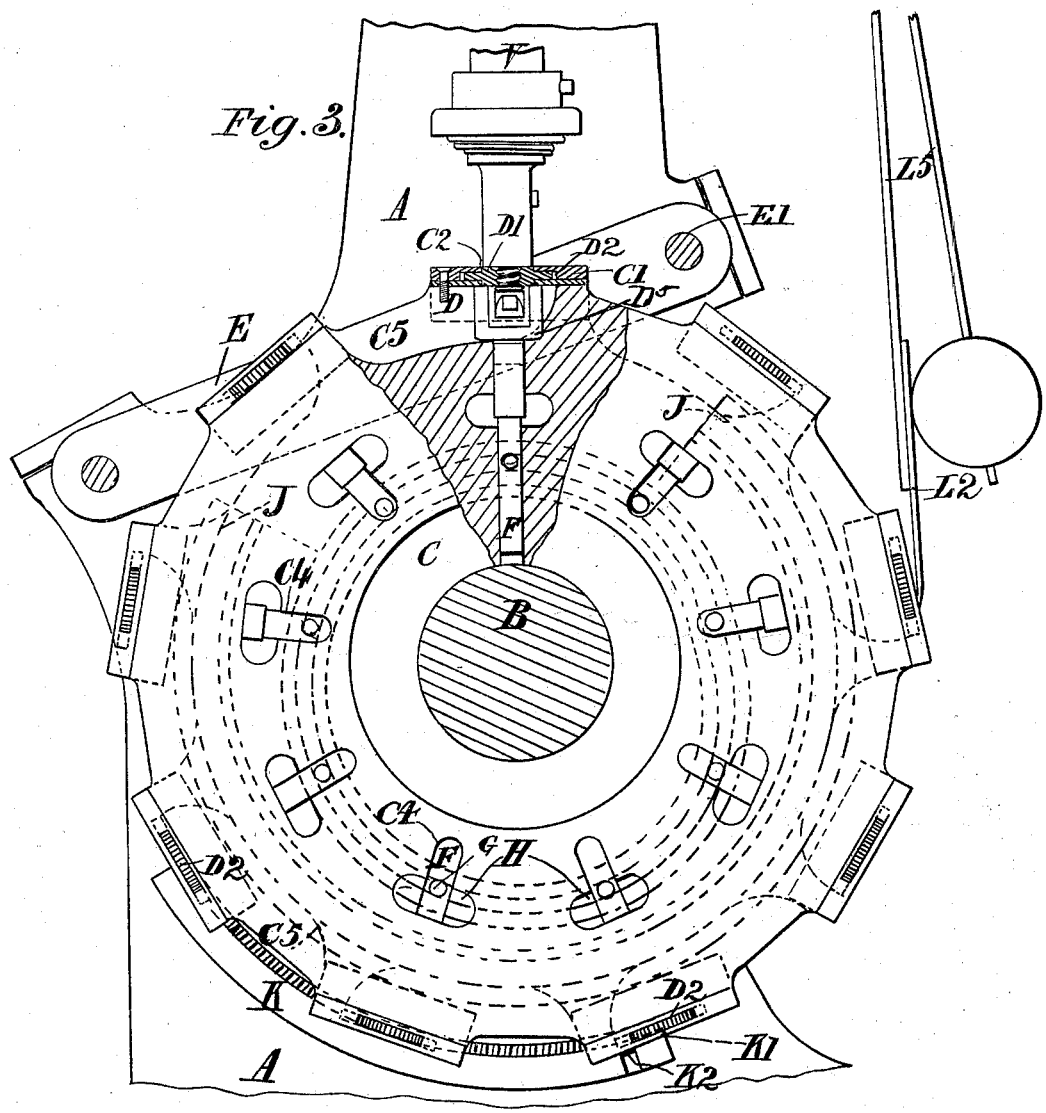
Figure 6:
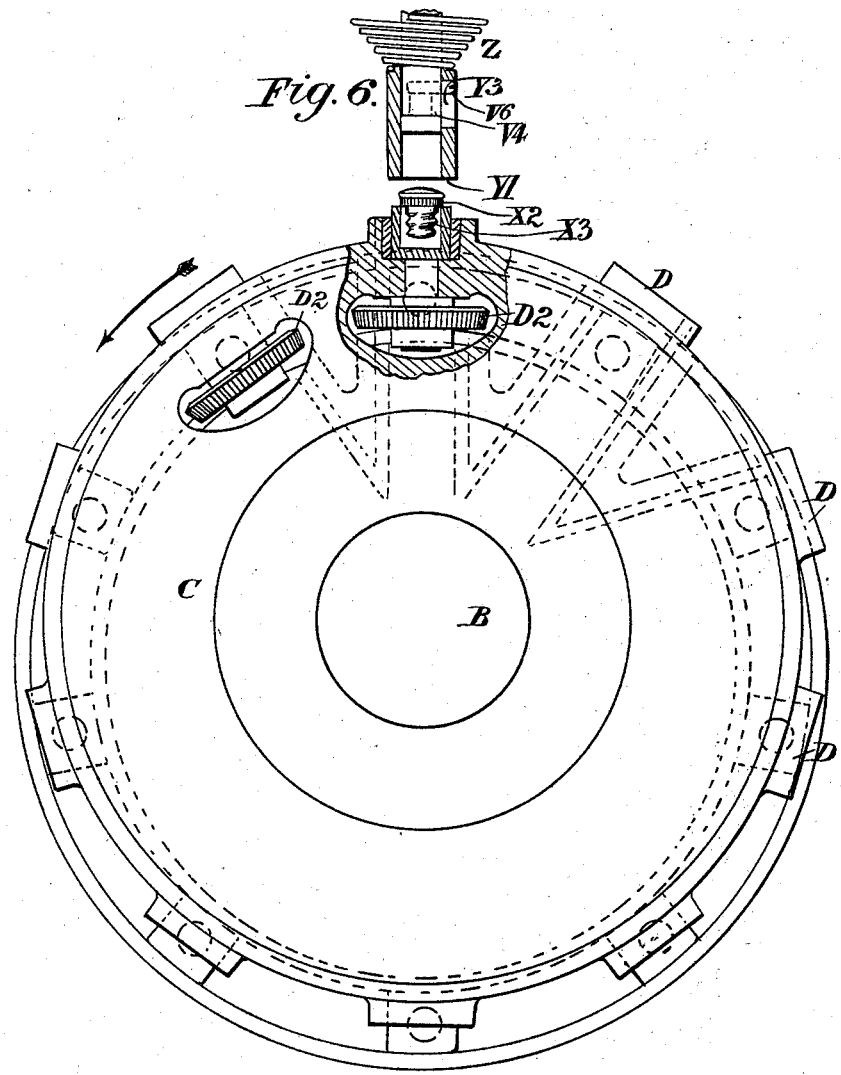

In the accompanying drawings, Figure 1 is a front elevation, partly in section, of a machine constructed according to this invention for the manufacture of screw bottle-stoppers. Fig. 2 is an end elevation, also partly in section, of the same machine. Figs. 3, 4, and 5, drawn to a larger scale than that of Figs. 1 and 2, are views of details of the machine illustrated in the two figures last named, Fig. 3 being an elevation, partly in section, of the turret or mold carrier and other adjacent parts of the machine, Fig. 4 being a plan of part of a toothed rack fixed on the main frame and of a screw-mold rotatable by that rack, and Fig. 5 being a central section of the screw-mold with a molded screw bottle-stopper in place therein, the stopper being shown in elevation. Fig. 6 is an elevation in part section, and Fig. 7 a vertical section to the same scale as that of Fig. 3, of an alternative construction of turret and its appurtenances designed for molding a stopper with a corrugated or roughened flange or head.

Like letters indicate like parts throughout the drawings.

With reference first to Figs. 1 to 5, A are parts constituting the main frame of the machine. B is the turret-shaft, which rotates intermittently in bearings A' on the frame A. C is the turret or mold-carrier, fixed on the turret-shaft B, so as to turn therewith.

The turret or mold-carrier C is of disk form in the present example. At equal angular distances around its circumference are molds D, each shaped internally to correspond with the exterior shape of the stopper or other article to be molded in it. The shape of stopper which the molds in the present instance are intended to produce is shown in Fig. 5, the stopper being lettered X.

Each mold (see Figs. 1 and 3) comprises a circular portion D' with a central perforation internally screw-threaded (see Figs. 4 and 5) to mold the male screw-thread of the stopper X and having teeth $D^2$ around its outer circumference to enable it to be rotated. C' is a suitably-divided cover-plate for each mold perforated centrally at $C^2$ and secured to the turret. Into the perforation $C^2$ fits a boss $D^3$, formed on the part D' of the mold, so that in effect the cover-plate not only keeps the part D' in place, but also serves as a bearing wherein it can turn. The teeth $D^2$ extend beyond the sides of the turret C and cover-plate C', so as to be able to gear with a fixed rack carried on the frame A. Below the part D' and supporting the same are two parts $D^4$, in which jointly the cavity for molding the head of the stopper X is formed. These two parts during the molding operation occupy the position in which they are shown in Fig. 1, but are separable, being arranged to slide away from each other along guide-channels partly formed in the turret C by guides $D^5$, Fig. 3, and in part formed by the under side of the plate C'. They travel in directions parallel with the turret-shaft B. The plane of division between the parts $D^4$ is one which contains the axes of the several molds and intersects the axis of the turret-shaft B at right angles. Thus each part contains one-half of the mold for the head of the stopper.

The parts $D^4$ are grooved at $D^6$, Fig. 1, for a purpose hereinafter explained, and their outer sides $D^7$ are adapted to bear against bars E during a part of each complete rotation of the turret. The bars E are parallel to each other and are secured in place at each side of the turret C, as shown, by strong pins E', which enter recesses in the frame A. The bars are slightly beveled on the sides E² and are so situated relatively to the circular path of the molds D that the latter in the rotation of the turret pass between them, the parts D⁴ of each mold being pressed toward each other by the bars E during transit. The outer face of each bar E bears against cheek-pieces A³ on the frame A, so that the bars E are strengthened against the reaction of the parts D⁴, and the frame is tied by a stay-rod U. The cheek-pieces A³ are formed as wedges and are adjustable on ribs on the main frame, so that they can be moved to pack up the bars E in case of wear. Between each mold and the turret-shaft B are spindles F, one of which is appropriated to each mold and arranged to reciprocate in a line coaxial with the mold-axis, being adapted to move in a part C³ of the turret formed to receive and guide it.

G is a pin which is fixed in the lower end of each spindle F and arranged to extend at opposite sides through slots C⁴ in the turret, so as to be caused by cams to move the spindle as desired. The end F' of each spindle F is recessed at F², so that when moved outward radially from the shaft B it can engage the head of the stopper and prevent the stopper from rotating during one of the operations presently to be described.

C⁵, Fig. 3, are openings in the turret for the discharge of the molded stopper.

H are grooved cams fixed to the frame A to move the spindles F in or out radially, as desired, by acting upon the pins G during the movement of the latter with the rotating turret.

J are other cams in the form of curved flanged bars fixed to the frame A. The flanges J' of the cams enter and operate upon the grooved portions D⁶ of the mold parts D⁴.

K is a toothed segmental rack (see Fig. 3) by which the toothed parts D' of the molds are engaged and rotated during that part of their travel which lies within the angular limit of the rack. To obviate danger of breaking the teeth of the rack K or the teeth D² of the part D' of the mold as they come together, the end K' of the rack is hinged at K², Fig. 4, so that it will yield, if necessary, to allow the teeth to gear properly.

K³ is a spring placed between the fixed and yielding parts of the rack to keep the latter normally in line with the fixed part. The form of the cams H and J and the extent of the cam J and rack K are chosen in a manner well understood by engineers to give the parts controlled thereby the desired movements in the order required, and therefore do not need to be more specifically described.

L is a heavy weight in the form of a table caused to rise and fall vertically above the turret C and carrying a compressor V, which is weighted by the table L and which, with the mechanism for controlling the table, is hereinafter described.

L² is a spring knife-carrier secured to the table L and having at its end a preferably detachable cutter or knife L³ in such proximity to the molds D that as it descends toward the adjacent mold it will shave off any of the plastic material which projects from said mold. L⁵ is a pendulum pivoted to the upper part of the knife or to the table L, so as to be moved up and down with the knife and by bearing against it prevent any undue oscillation or vibration of said knife. The knife and pendulum having different periods of vibration each neutralizes the vibration of the other, and thus the knife is kept steady.

L⁴ is a sliding block carried by the table L, so that it can be pushed in between the cross-piece of the frame A and the table to prevent the latter from descending.

To operate the turret and table, the driving-shaft M is provided. It turns in bearings A⁴ on the frame A and has a spur-wheel M' fixed on near one end. N is a shaft journaled in bearings A⁵ in the frame A and driven from any convenient source of power. Upon it is fixed a spur-pinion N', Fig. 2, which gears with the spur-wheel M', so as to rotate the driving-shaft M.

O is a circumferentially-grooved ratchet-wheel fixed on the turret-shaft B and having at its circumference teeth O' at the same angular intervals as the molds D on the turret C.

P is a pawl to impart intermittent motion to the ratchet-wheel O and the turret-shaft B. It is pivoted on the crank-pin M² of the crank M³, formed in the driving-shaft M. On one end of the pawl, which is received in the groove O² in the ratchet-wheel O, is a transverse pin P' to engage the teeth O'. On the other end of the pawl, which is extended beyond the crank-pin M², is a counterbalance P² to keep the pin P' bearing always against the teeth O'.

The reciprocating table L is caused to rise slowly and permitted to descend rapidly by cams Q of some such profile as is indicated in Fig. 2. One of these is keyed near each end of the driving-shaft M. R are rods adapted to be reciprocated vertically by the cams Q in guides A⁶, formed on the frame A. The upper ends of the rods R carry the table L. The lower ends are of inverted-T form, as shown in Fig. 2, and are provided with wearing-strips R' to bear on the cams Q. The wearing-strips have tongues R² to engage with the T ends and are so placed that the frictional drag of the cams Q tends always to keep the tongues close against the T ends. The direction of rotation of the cams and other rotating parts is indicated by arrows in Fig. 2.

V is the body of the compressor, secured to the table L and projecting downward from it through a guide A², formed on the frame A, to act on the contents of the molds D, carried by the turret C.

V' is a screw-threaded socket in which the screw-threaded rod V² is adjustable to vary the effective length of the compressor as desired.

W is a lock-nut to secure the rod $V^2$ after adjustment. To the lower end of the rod $V^2$ is secured the plunger $V^3$, and in the lower end $V^4$ of the plunger or a die carried by it and readily removable therefrom is a concave or other matrix shaped to impart the desired form, imprint, or pattern to that part of the "plastic blank" with which it comes in contact.

Y is a sleeve encircling the plunger projecting in advance of the same and having its end $Y'$ shaped to fit close against the opposed face of the mold D below it. In the present example the sleeve is provided at its upper end with a flange $Y^2$ and the rod $V^2$ has a flanged disk $V^5$ secured to it, a spring Z being retained in compression between the flange $Y^2$ and disk $V^5$ to exert a pressure tending always to keep the sleeve Y at that extreme of its travel on the plunger $V^3$ at which it is shown in the drawings, but permitting the sleeve to yield and remain stationary relatively to the mold D as soon as it comes against the face thereof, while the plunger $V^3$ moves on till its lower end is level with or near to the top of the part D. When this occurs the operation of compression is complete.

$V^6$ is a stud screwed into the plunger $V^3$ and entering a slot $Y^3$, formed in the sleeve Y, so as to limit the downward movement of the sleeve under the influence of the spring Z.

The spring Z might be omitted if the extension Y were suitably weighted or otherwise controlled so as to tend always to move to that extreme of its travel at which it is shown in the drawings. Further, the arrangement might be inverted—that is to say, a portion of the mold provided with a yielding sleeve Y could be placed in the position of the part D, a solid plunger being then applied to the compression device V.

The manufacture of a screw bottle-stopper by this machine is effected as follows: A preferably cylindrical piece or plug of softened vulcanite of suitable size is placed in each mold D just before it passes under the plunger $V^3$. The shaft M, being driven continuously and at uniform speed by the shaft N, causes the pawl P to operate the turret-shaft B intermittently by way of the ratchet-wheel O to bring the molds D in succession under the plunger $V^3$, below which every mold makes a momentary pause. During this pause cams Q permit the heavy table L to descend rapidly and bring down the plunger $V^3$ upon the piece of vulcanite (which projects from the mold-orifice) and force it into the mold-cavity in the parts $D'$ and $D^4$, so that it takes the form of the space bounded by the walls of that cavity and the lower end of the plunger $V^3$. Thus in one operation the stopper is completely molded. When the end $Y'$ of the sleeve Y meets the face of the mold D in the advance of the whole compression device V toward the latter, the sleeve Y is stopped, being allowed by the spring Z to yield relatively to the plunger $V^3$, which continues to move onward and effect the compression of the mass in the mold. During the molding operation the bars E bear against the parts $D^4$ of the mold to resist the bursting tendency induced by the compression of its contents. Next the plunger $V^3$ is slowly raised with the table L by the cams Q in readiness for operating on the plastic or softened material in the next succeeding mold. When the plunger $V^3$ recedes from the mold D, the sleeve Y remains in contact with the latter till the stud $V^6$ reaches the top end of the slot $Y^3$, whereupon the sleeve rises with the plunger in readiness for the succeeding operation and the turret C moves onward for another portion of a revolution, taking the mold containing the molded stopper into the range of the cam J and toward the rack K. These and the cams H operate as follows during the successive movements of the turret: First the cams J cause the mold-sections $D^4$ to move apart clear of the head of the stopper and next the cams H act on the pin G to move the spindle F radially outward from the shaft B until the recessed end $F'$ of the spindle F reaches the head $X'$, Fig. 5, of the molded stopper X, which is received in the cavity $F^2$. By the time that this movement of the spindle F is completed the teeth $D^2$ on the portion $D'$ of the mold are brought by the turret into gear with the fixed rack K and the part $D'$ is rotated. This rotation screws the molded stopper out of the part $D'$ toward the center of the turret, inasmuch as the stopper itself being engaged by the rod F is prevented from rotating. The rod F is moved inward toward the center of the turret by the cams H at preferably the same speed as that at which the stopper is being unscrewed in the same direction by the part $D'$, but to a greater distance, so that the stopper after being screwed completely out of the part $D'$ will fall away from the head $F'$ of the spindle F and out of the opening $C^5$ in the turret into a chute or receptacle. (Not shown in the drawings.) It should be understood that at the time this discharging operation occurs the spindle F will have moved with the turret so as to lie in some such position as is indicated at $Y^4$, Fig. 2, and consequently the released stopper falls away from the turret. As the mold moves onward to be again charged the parts thereof and the spindle F are caused by the cams H and J to reassume the relative positions in which they are shown in Fig. 1, and after the mold is recharged a similar cycle of operations ensues. The several molds commence and complete their cycles in turn, as will be readily understood.

Figure 7:
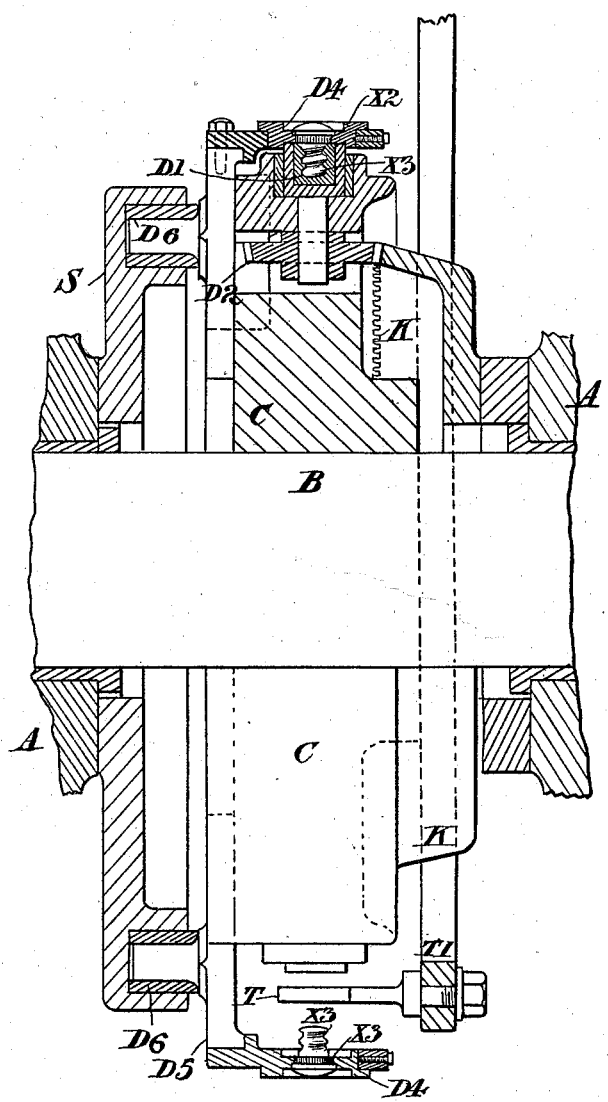

In the alternative construction of turret illustrated in Figs. 6 and 7, which is specially devised for making screw bottle-stoppers with heads of circular form, the flanged and ribbed or milled circumference $X^2$ of the stopper shown in that figure is formed by a portion $D^4$ of the mold, which in the former example, Fig. 2, was divided, but in this example is made in one piece, the central perforation therein being tapered to facilitate the exit of the completed stopper. Externally the part $D^4$ is flanged and so secured that it can be readily removed and replaced by dies of the same external but different internal form. The convex part of the stopper-head is shaped by a plunger, such as $V^3$ in Fig. 1, which is given a concave end. The screw-threaded stem $X^3$ of the stopper is molded in the cavity of a die $D'$, which is rotatable in bearings in the turret C and has a bevel-gear $D^2$ fixed to it and extending beyond the sides of the turret. This bevel-wheel is adapted to engage with a continuous toothed rack K, fixed on the main frame of the machine, so that after the stopper is molded the bevel-wheel $D^2$ is rotated to screw the stopper out of the mold. To prevent the stopper from rotating while being thus unscrewed, I form the mold portion $D^4$ in one with a bar $D^5$, Fig. 7, with which it is free to move to about the extent of twice the length of the stopper-stem $X^3$ inward and outward on lines radiating from the axis of the turret-shaft B. Each of the bars $D^5$ carries a projection or antifriction-roller $D^6$, which engages with the groove of a fixed and conveniently circular cam S, arranged eccentrically to the axis of the turret-shaft B. During the descent of the plunger $V^3$ the turret is stationary, as before described, and consequently the die $D'$ has no movement about its axis. As soon as the molding operation is completed and the plunger $V^3$ ascends the turret C is moved outward, as indicated by the arrow in the drawings, and the wheel $D^2$ and die $D'$ are consequently rotated, and by reason of the screw-thread on the stopper the die moves the latter outward, the stopper meanwhile being prevented from rotating by the mold portion $D^4$, to which its head for the time being adheres.

By the last-described arrangement the mold portions $D^4$, although always brought at the proper moment to their molding position at the upper part of the turret, are, by the eccentric cam S, gradually moved outward during their descent until they are quite clear of the turret at the lower part of the latter, at which part a bar or tappet T is located, this bar being provided with an arm T', extending upward into the path of the table L, so that at each descent of the latter the tappet T is moved downward and the stopper then beneath it is driven out of the mold part $D^4$. After this ejection the cam or eccentric S returns the part $D^4$ to the position in which it is shown in Fig. 1—that is to say, to its molding position. The cam or eccentric S is adapted to move the mold part $D^4$ outward at a speed corresponding to that at which the stopper is moved outward by the rotation of the mold part $D'$. In Fig. 6, wherein the wheel $D^2$ is adapted to rotate eight times at each rotation of the turret C, one-eighth of the rotation of the latter is sufficient to free the stopper from the mold $D'$. A hydraulic or steam press or a spring or springs may be employed instead of the table L to exert the desired pressure on the compressor V and its plunger $V^3$, and instead of the disk type of mold-carrier a belt or a series of links or a reciprocating bar or a table turning in a horizontal plane can be employed to carry the molds and present them in turn to the compressor.

The racks K, hereinbefore referred to, may be carried on springs or other elastic supports to insure easy working of the wheels with which they gear and to avoid risk of breaking the teeth of the rack and wheels.

Although this invention is hereinbefore described with reference, by way of example, to the manufacture of screw bottle-stoppers, it is applicable with equal advantage to the manufacture from plastic material of other articles with or without screw-threads. Moreover, the plungers $V^3$ may be arranged in a series, descending simultaneously to operate upon material in molds, the latter being arranged in groups upon the mold-carrier instead of singly.

I claim—

1. In a machine for molding bottle-stoppers and the like, the combination of a mold comprising a perforated section, and a section composed of two parts supported to be brought together and separated, and a compressor operating in connection with said mold, substantially as described.

2. In a machine for molding bottle-stoppers and the like, the combination of a mold comprising a section adapted to form the shank of the stopper, and a section having a cavity to form the head of the stopper and being of two parts supported to be brought together and separated, and a compressor operating in connection with said mold, substantially as described.

3. In a machine for molding bottle-stoppers and the like, the combination of a mold comprising a section having a screw-threaded perforation to form the neck of the stopper, and another section having a cavity to form the head of the stopper, and being of two parts supported to be brought together and separated, and a compressor operating in connection with said mold, substantially as described.

4. In a machine for molding bottle-stoppers and the like, the combination of a mold carrier or turret, a mold carried thereby comprising a perforated section, and a section in two parts supported to be brought together and moved apart, means for separating said parts and again drawing them together, means for ejecting the molded article during the separation of these parts, and a compressor, substantially as described.

5. In a machine for molding bottle-stoppers and the like, the combination of an intermittently-movable carrier or turret, a mold carried thereby comprising a section constructed to form the neck of the stopper, and another section constructed to form the head of the stopper, and being in two parts supported to be brought together and moved apart, means for separating said parts and again drawing them together, means for ejecting the stopper during the separation of these parts, and a compressor, substantially as described.

6. In a machine for molding bottle-stoppers and the like, the combination of an intermittently-operating carrier or turret, a mold carried thereby comprising a section constructed to form the neck of the stopper, and another section constructed to form the head of the stopper, and being in two parts adapted to be brought together and moved apart, pressure devices operating upon said parts at one period of movement of the turret, means for separating said parts and again drawing them together, means for ejecting the molded stopper, and a compressor, substantially as described.

7. In a machine for molding bottle-stoppers and the like, the combination of a mold carrier or turret, a mold and compressor adapted to form a stopper having a head and a threaded neck, and means for unscrewing the completed stopper from the mold, substantially as described.

8. In a machine for molding bottle-stoppers and the like, the combination of a mold and a plunger adapted to form a stopper having a head and a threaded neck, means for grasping the stopper at the moment of completion, and means for rotating the mold while the stopper is so held whereby said stopper is ejected, substantially as shown and for the purpose described.

9. In a machine for molding bottle-stoppers and the like, the combination of a compressor, and a mold carrier or turret, a mold carried thereby comprising a section constructed to form the screw-threaded neck of a stopper, and another section constructed to form the head of the stopper, and being in two parts adapted to be drawn together and separated, means for separating these parts and again drawing them together, means for grasping the head of the stopper as soon as such separation takes place, and means for unscrewing the completed stopper from the first-named mold-section, and ejecting the stopper, substantially as described.

10. In a machine for molding bottle-stoppers and the like, the combination of a compressor and a mold carrier or turret, a mold carried by the latter comprising a section constructed to form the screw-threaded neck of a stopper, and another section constructed to form the head of the stopper and being in two parts adapted to be drawn together and separated, means for separating these parts and again drawing them together, a radially-moving device for grasping the head of the stopper as soon as such separation takes place, means for rotating the first-named mold-section to carry the stopper inwardly with the said radially-moving device, this device moving inwardly at the same speed as that at which the stopper is moved, but to a greater extent, substantially as described.

11. In a machine for molding bottle-stoppers and the like, the combination of an intermittently-revolving mold carrier or turret, a plunger or compressor and means for operating the same at regular intervals, a series of molds carried by the turret, each comprising a section having a screw-threaded perforation, and another section having a cavity and being in two parts supported to be drawn together and separated, a cam for separating said parts and again drawing them together, a radially-movable rod operated to grasp the molded article immediately such separation takes place, and means for rotating the mold-section first named during the inward or return movement of said rod, substantially as described.

12. In a machine for molding bottle-stoppers and the like, the combination of an intermittently-revolving mold carrier or turret, a plunger or compressor and means for operating the same at regular intervals, a series of molds carried by the turret, each comprising a section having a screw-threaded perforation, and another section having a cavity and being in two parts supported to be drawn together and separated, a stationary cam for separating said parts and again drawing them together, a series of radially-movable rods corresponding to the series of molds and operating successively to grasp the molded articles as the movable parts of each mold are separated, and means for successively rotating the mold-sections first named at the same rate of speed as the return or inward movement of the said movable rods, substantially as described.

13. In a machine for molding bottle-stoppers, the combination of the revolving mold carrier or turret having radial openings or passages, a series of molds carried by said turret and each being constructed with the two-part section, as described, rods movable in and out of the said radial openings, and a cam for operating the same in succession, means for separating the movable parts of the mold-sections, the devices for successively rotating the one-part mold-section and a plunger or compressor, substantially as described.

14. In a machine for molding bottle-stoppers and the like, the combination of an intermittently-revolving carrier or turret, and a plunger or compressor, a series of molds carried by the turret, each comprising a section having a screw-threaded opening and a toothed periphery, and another section in two parts adapted to be drawn together and separated, a cam for separating said parts and again drawing them together, movable devices for successively holding the molded articles after the separation of the movable parts of the mold-section takes place, and a rack with which the toothed sections of the 15. In a machine for molding bottle-stoppers and the like, the combination of an intermittently-operating carrier or turret, a mold carried thereby comprising a section having a perforation, and another section having a cavity and being in two parts supported to be drawn together and moved apart, side bars and wedges for pressing said parts together at one point in the movement of the turret, means for separating the parts and again bringing them together, and a compressor or plunger and means for operating the same at regular intervals, substantially as described.

16. In a machine for molding bottle-stoppers and the like, the combination of an intermittently-operating carrier or turret, a series of molds carried thereby each constructed to mold a stopper having a threaded neck, and each being movable or separable in part to release the completed stopper, means for successively separating the movable parts of the molds and after an interval again drawing them together, means for holding the stoppers during such intervals, and means for simultaneously unscrewing the stoppers from the molds in succession, substantially as described.

17. In a machine for molding bottle-stoppers and the like, the combination of an intermittently-operating carrier or turret, a series of molds carried thereby each being in two sections and one of the sections being in two parts adapted to be drawn together and moved apart, means for successively separating said parts and after an interval again drawing them together, and means for withdrawing the completed articles from the molds during said intervals, substantially as described.

18. In a machine for making bottle-stoppers and the like, the combination of an intermittently-operating carrier or turret, a series of molds carried thereby and comprising one section constructed to form the neck of the stopper, and another section for shaping the head of the stopper and composed of two parts adapted to be drawn together and moved apart, means for successively separating said parts and after an interval again drawing them together, means for withdrawing the completed stoppers from the molds during such intervals, and means for grasping and holding the head of each stopper during such withdrawal, substantially as described.

19. The combination with a mold provided with interior screw-threads, of a compressor adapted to coöperate with the mold, and devices for causing a relative rotation between the mold and the article molded to effect the discharge of the article from the mold, substantially as described.

20. The combination with a reciprocating compressor, of a series of molds provided with interior screw-threads, means for moving the molds successively beneath the compressor and devices for causing a relative rotation between the mold and the article contained therein to effect the discharge of the latter from the mold, substantially as described.

21. The combination with a revolving mold-carrier having a series of molds around its periphery, and a plunger coöperating with the molds, of a reciprocating or movable table for operating the plunger, and a knife carried by the table and operating upon the faces of the molds, substantially as shown and described.

In testimony whereof I have hereto set my hand in the presence of the two subscribing witnesses.

CHRISTIAN HAMILTON GRAY.

Witnesses:
ALFRED J. BOULT,
HARRY B. BRIDGE.